(12) United States Patent
Xu et al.

(10) Patent No.: US 11,461,870 B2
(45) Date of Patent: Oct. 4, 2022

(54) IMAGE PROCESSING METHOD AND DEVICE, AND ELECTRONIC DEVICE

(71) Applicant: BEIJING SENSETIME TECHNOLOGY DEVELOPMENT CO., LTD., Beijing (CN)

(72) Inventors: Qinqin Xu, Beijing (CN); Mingyang Huang, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 70 days.

(21) Appl. No.: 17/105,716

(22) Filed: Nov. 27, 2020

(65) Prior Publication Data

US 2021/0104012 A1 Apr. 8, 2021

Related U.S. Application Data

(63) Continuation of application No. PCT/CN2020/087498, filed on Apr. 28, 2020.

(30) Foreign Application Priority Data

Sep. 30, 2019 (CN) .......................... 201910944389.8

(51) Int. Cl.
*G06T 3/00* (2006.01)
*G06T 5/50* (2006.01)
(Continued)

(52) U.S. Cl.
CPC ............ *G06T 3/0012* (2013.01); *G06K 9/629* (2013.01); *G06T 5/50* (2013.01); *G06V 40/171* (2022.01);
(Continued)

(58) Field of Classification Search
CPC .................... G06T 3/0012; G06T 5/50; G06T 2207/20221; G06T 2207/30201;
(Continued)

(56) References Cited

U.S. PATENT DOCUMENTS 9,104,908 B1 * 8/2015 Rogers ............... G06V 10/7557
10,929,648 B2 * 2/2021 Lu ............................ G06N 3/04
(Continued)

FOREIGN PATENT DOCUMENTS

CN       103745237 A       4/2014
CN       108229330 A       6/2018
(Continued)

OTHER PUBLICATIONS

First Office Action of the Japanese application No. 2020-566648, dated Feb. 7, 2022, 11 pgs.
(Continued)

*Primary Examiner* — Wesley J Tucker
(74) *Attorney, Agent, or Firm* — Cooper Legal Group, LLC

(57) ABSTRACT

Provided are an image processing method and device and an electronic device. The method may include: a first image and a second image are obtained; a facial key point of a target object in the first image is detected to obtain information of a first key point; a facial key point of a target object in the second image is detected to obtain information of a second key point; a conversion relationship is determined based on the information of the first key point and the information of the second key point; and faces of the target objects in the first image and the second image are fused based on the conversion relationship to obtain a third image.

18 Claims, 10 Drawing Sheets

(51) Int. Cl.
*G06K 9/62* (2022.01)
*G06V 40/16* (2022.01)

(52) U.S. Cl.
CPC .............. G06T 2207/20221 (2013.01); *G06T 2207/30201* (2013.01)

(58) Field of Classification Search
CPC .... G06T 3/0093; G06K 9/629; G06V 40/171; G06V 40/168
See application file for complete search history.

(56) References Cited

U.S. PATENT DOCUMENTS

| | | | |
|---|---|---|---|
| 2008/0165187 A1* | 7/2008 | Marugame | G06T 17/10 345/420 |
| 2018/0061006 A1 | 3/2018 | Lei et al. | |
| 2018/0068178 A1 | 3/2018 | Theobalt et al. | |
| 2018/0204052 A1* | 7/2018 | Li | G06T 7/11 |
| 2019/0122329 A1 | 4/2019 | Wang et al. | |
| 2019/0251684 A1* | 8/2019 | Ko | G06T 5/50 |
| 2019/0289986 A1 | 9/2019 | Fu et al. | |
| 2020/0258206 A1* | 8/2020 | Shen | G06V 20/647 |
| 2020/0334812 A1 | 10/2020 | Su et al. | |
| 2020/0364838 A1* | 11/2020 | Liu | G06T 11/001 |
| 2020/0380682 A1* | 12/2020 | Gao | G06T 7/0014 |
| 2021/0142440 A1* | 5/2021 | Ahn | G06K 9/6271 |
| 2021/0182537 A1* | 6/2021 | Cao | G06V 40/171 |
| 2021/0183166 A1* | 6/2021 | Hu | G06T 19/20 |
| 2021/0232806 A1* | 7/2021 | He | G06K 9/6262 |

FOREIGN PATENT DOCUMENTS

| | | | |
|---|---|---|---|
| CN | 108537135 | A | 9/2018 |
| CN | 109147012 | A | 1/2019 |
| CN | 109712080 | A | 5/2019 |
| CN | 109801249 | A | 5/2019 |
| CN | 109934766 | A | 6/2019 |
| CN | 110136224 | A | 8/2019 |
| CN | 110163832 | A | 8/2019 |
| CN | 110443230 | A | 11/2019 |
| CN | 110728620 | A | 1/2020 |
| GB | 2355789 | A | 5/2001 |
| JP | 2013171470 | A | 9/2013 |
| JP | 2019053706 | A | 4/2019 |
| KR | 20070068501 | A | 7/2007 |
| KR | 20100121944 | A | 11/2010 |
| KR | 101089287 | B1 | 12/2011 |
| KR | 20150039028 | A | 4/2015 |
| KR | 20190096703 | A | 8/2019 |
| TW | 201339992 | A | 10/2013 |
| TW | M474207 | U | 3/2014 |
| WO | 0131581 | A1 | 5/2001 |
| WO | 2019133266 | A1 | 7/2019 |

OTHER PUBLICATIONS

First Office Action of the Korean application No. 10-2020-7033809, dated Sep. 7, 2021, 18 pgs.
International Search Report in the international application No. PCTICN2020/087498, dated Jul. 23, 2020, 3 pgs.
"Privacy of Facial Soft Biometrics: Suppressing Gender But Retaining Identity", Mar. 2015, ASEM Othman and Arun Ross. Conference paper, Part of the Lecture Notes in Computer Science book series (LNIP,vol. 8926), Springer International Publishing, pp. 682-696.
Supplementary European Search Report in the European application No. 20873322.0, dated Jul. 13, 2022, 12 pgs.

* cited by examiner

IMAGE PROCESSING METHOD AND DEVICE, AND ELECTRONIC DEVICE

CROSS-REFERENCE TO RELATED APPLICATION

The present application is a continuation of International Patent Application No. PCT/CN2020/087498, filed on Apr. 28, 2010, which claims priority to Chinese Patent Application No. 201910944389.8, filed on Sep. 30, 2019. The disclosures of International Patent Application No. PCT/CN2020/087498 and Chinese Patent Application No. 201910944389.8 are hereby incorporated by reference in their entireties.

TECHNICAL FIELD

The disclosure relates to an image processing technology, and particularly to an image processing method and device and an electronic device.

BACKGROUND

In related art, there is yet no effective solution for how to fuse different faces in two different face images to obtain one face.

SUMMARY

A first aspect of the disclosure provides a method for image processing, which may include the following operations.

A first image and a second image are obtained. A facial key point of a target object in the first image is detected to obtain information of a first key point. A facial key point of a target object in the second image is detected to obtain information of a second key point. A conversion relationship is determined based on the information of the first key point and the information of the second key point. Faces of the target objects in the first image and the second image are fused based on the conversion relationship to obtain a third image.

A second aspect of the disclosure provides an image processing device, which may include an acquisition unit, a key point detection unit and a fusion processing unit.

The acquisition unit may be configured to obtain a first image and a second image.

The key point detection unit may be configured to detect a facial key point of a target object in the first image to obtain information of a first key point and detect a facial key point of a target object in the second image to obtain information of a second key point.

The fusion processing unit may be configured to determine a conversion relationship based on the information of the first key point and the information of the second key point, and fuse faces of the target objects in the first image and the second image based on the conversion relationship to obtain a third image.

A third aspect of the disclosure provides a computer-readable storage medium in which a computer program may be stored, the program being executed by a processor to implement the operations of the method of the embodiments of the disclosure.

A fourth aspect of the disclosure provides an electronic device, which may include a memory, a processor and a computer program stored in the memory and capable of running in the processor, the processor executing the program to implement the operations of the method of the embodiments of the disclosure.

A fifth aspect of the disclosure provides a processor, which may be configured to call a computer program, the processor executing the program to implement the operations of the method of the embodiments of the disclosure.

DETAILED DESCRIPTION

The disclosure will further be described below in combination with the drawings and specific embodiments in detail.

Figure 1:
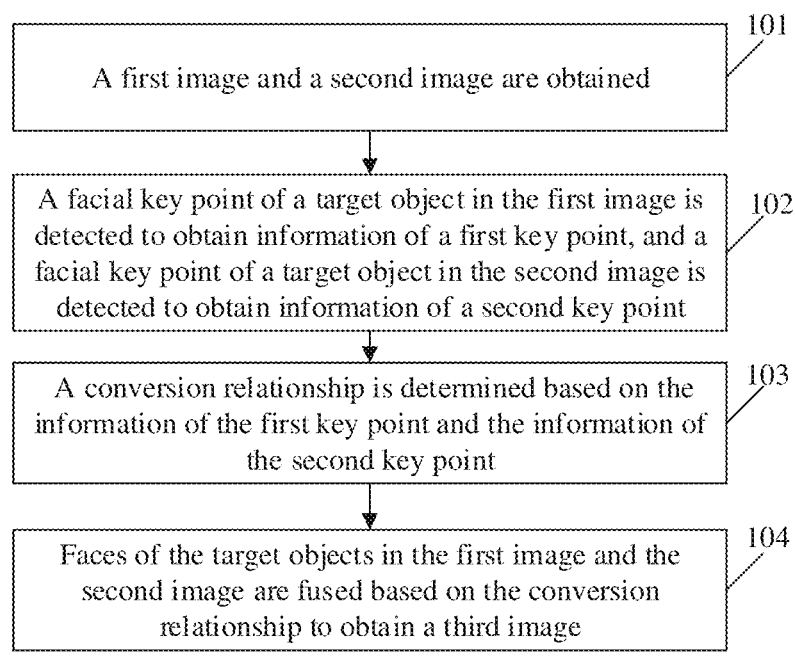
FIG. 1 is a first flowchart of an image processing method according to an embodiment of the disclosure.

The embodiments of the disclosure provide an image processing method. FIG. 1 is a first flowchart of an image processing method according to an embodiment of the disclosure. As shown in FIG. 1, the method includes the following operations.

In operation 101, a first image and a second image are obtained.

In operation 102, a facial key point of a target object in the first image is detected to obtain information of a first key point, and a facial key point of a target object in the second image is detected to obtain information of a second key point.

In operation 103, a conversion relationship is determined based on the information of the first key point and the information of the second key point.

In operation 104, faces of the target objects in the first image and the second image are fused based on the conversion relationship to obtain a third image.

In the embodiment, the first image and the second image may include faces of target objects. The target objects may be real persons in the images. In another implementation mode, the target objects may also be virtual persons, for example, cartoon characters. The target objects may also be objects of other types. No limits are made thereto in the embodiment of the disclosure.

In some embodiments, the first image and the second image include different target objects. For example, both the first image and the second image include faces, but the first image and the second image include different faces. In this embodiment, fusion processing is mainly performed on different faces to synthesize one face.

In the embodiment, both the information of the first key point and the information of the second key point include key point information of each organ in a facial region and contour key point information of an edge of the facial region. The organ in the facial region may include at least one of following: eye, nose, mouse, eyebrow and the like. The key point information of each organ in the facial region may include central key point information of each organ and/or contour key point information of the organ. The contour key point information of the edge of the facial region is key point information corresponding to a contour of the facial region. The information of the first key point and the information of the second key point may include, but not limited to, coordinates of key points. The information of the first key point and the information of the second key point may further include, for example, type identifiers of the key points. Exemplarily, a type identifier may indicate whether a key point is a key point of an organ or a contour key point of an edge.

In some embodiments of the disclosure, the operation 102 that the facial key point of the target object in the first image is detected to obtain the information of the first key point may include that: the first image is detected based on a facial key point detection algorithm to obtain key point information of each organ in a facial region of the first image and contour key point information of an edge of the facial region.

The operation that the contour key point information of the edge of the facial region is obtained may include: a information of a first set of contour points of a region below eyes in the facial region is obtained; a information of a second set of contour points of a forehead region is determined based on key point information related to the forehead region in the facial region; and the contour key point information of the edge of the facial region is determined based on the information of the first set of contour points and the information of the second set of contour points. Correspondingly, detecting the second image to obtain the corresponding information of the second key point is similar to the above step of obtaining the information of the first key point and will not be elaborated herein.

Figure 2A:
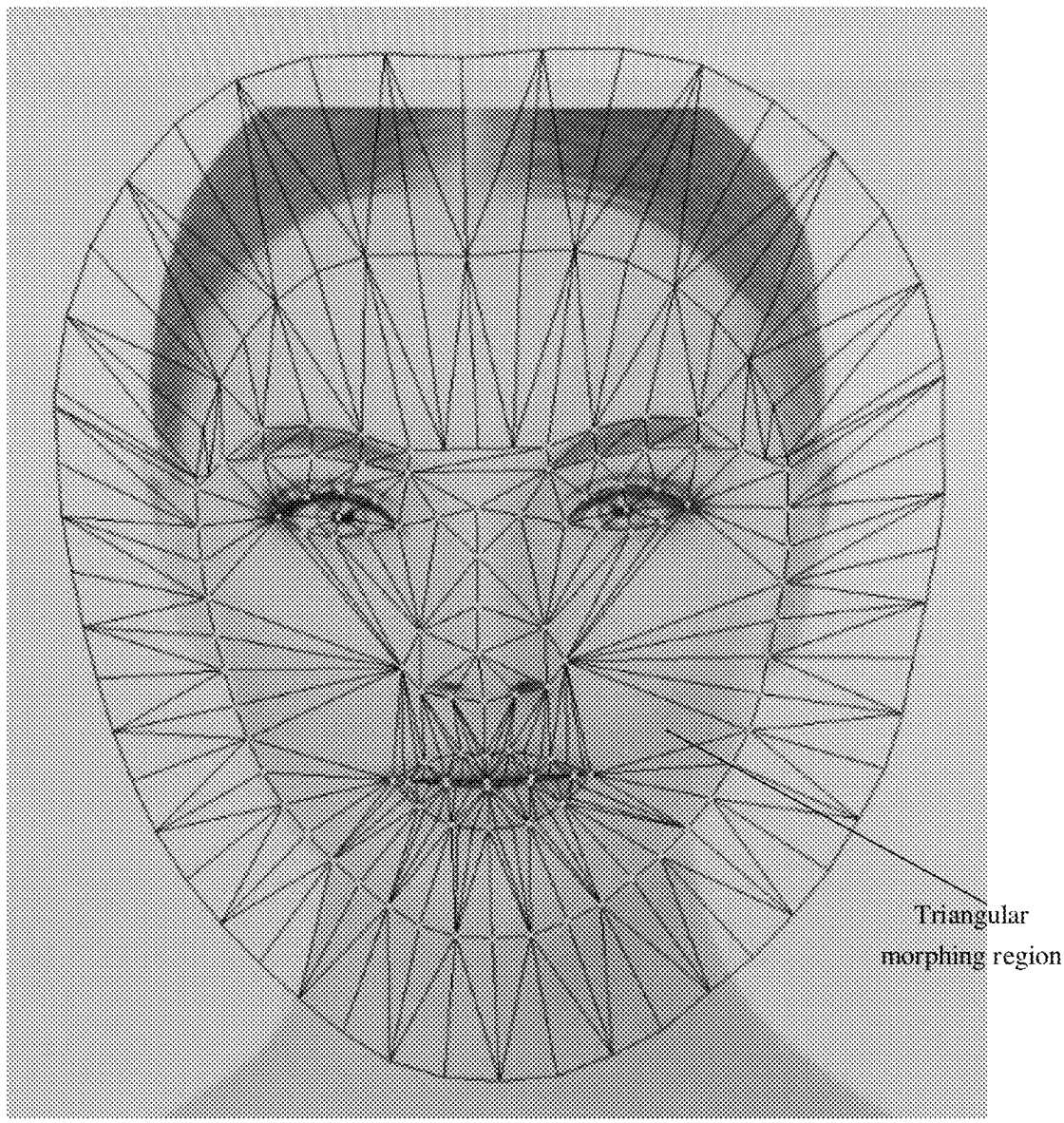
FIG. 2A is a schematic diagram of facial key points in an image processing method according to an embodiment of the disclosure.

FIG. 2A is a schematic diagram of facial key points in an image processing method according to an embodiment of the disclosure. As shown in FIG. 2A, on a first aspect, a key point of an organ in a facial region may specifically be a key point of at least one of the following organs in the facial region: eyebrow, eye, nose, mouse and the like. In some implementation modes, key point information of an organ may include central key point information of the organ and/or contour key point information of the organ. For example, when the organ is eye, key point information of the eye includes central key point information of the eye and contour key point information of the eye. For example, the key point information of the eye includes a coordinate of a central key point of the eye and a coordinate of a contour key point of the eye. For another example, when the organ is eyebrow, key point information of the eyebrow may include contour key point information of the eyebrow. For example, the key point information of the eyebrow may include a coordinate of a contour key point of the eyebrow. In the embodiment, key point information of each organ in the facial region is first obtained through a facial key point detection algorithm.

Figure 2B:
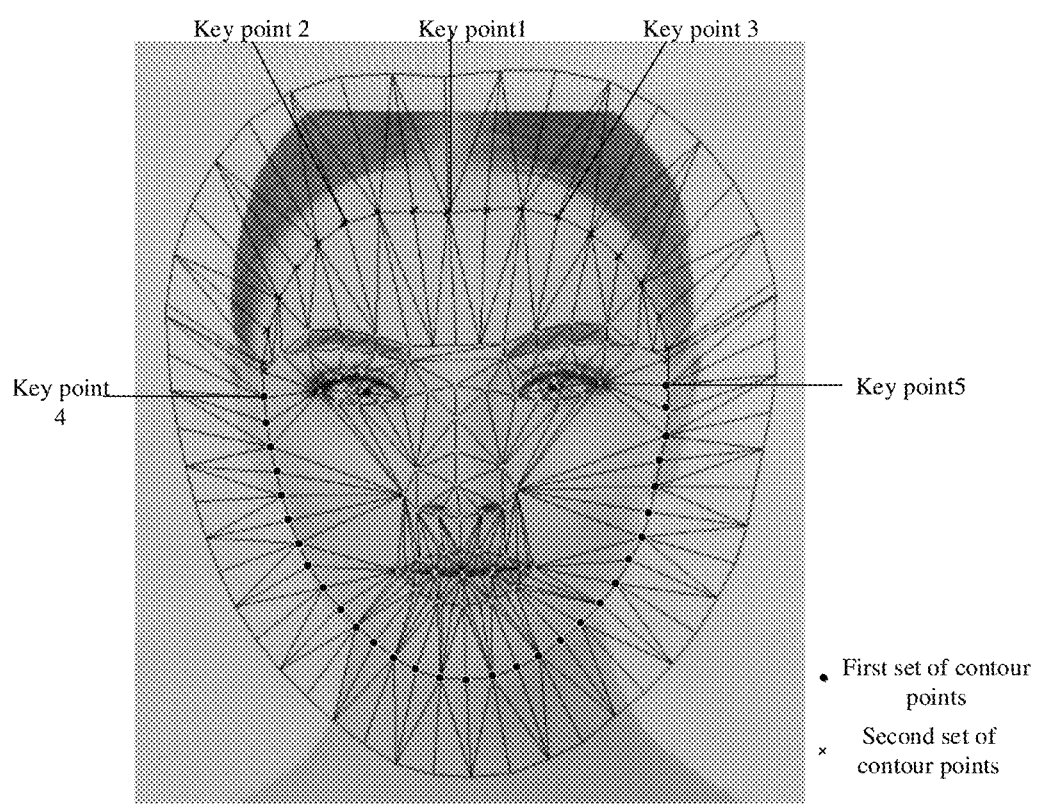
FIG. 2B is a schematic diagram of a information of a first set of contour points and a information of a second set of contour points in facial key points according to an embodiment of the disclosure.

On a second aspect, the information of the first set of contour points of the region below the eye in the facial region may be obtained through the facial key point detection algorithm. A first set of contour points are shown in FIG. 2B. In some embodiments, a relatively small number M1 of key points, for example, 5 key points, below the eye in the facial region may be obtained through the facial key point detection algorithm. Then, M2 key points may be obtained for the M1 key points in a curve interpolation manner. The M1 key points and the M2 key points are taken as the information of the first set of contour points.

The facial key point detection algorithm may be any face recognition algorithm.

On a third aspect, the contour key point information of the forehead region may be acquired. As an example, information of at least three key points in the forehead region of the facial region may be determined based on a preset parameter. For example, information of three key points is determined. As shown in FIG. 2B, key point 1 corresponds to a key point on a central line of the forehead region, and key point 2 and key point 3 are on two sides of the key point 1 respectively. Curve fitting may be performed on key point 4 and key point 5 at two ends in the information of the first set of contour points (the key point 4 and the key point 5 are key points closest to the eyes in the information of the first set of contour key points), the key point 1, the key point 2 and the key point 3 to obtain curve-fitted key point information. Interpolation information may be performed on the curve-fitted key point information based on a curve interpolation algorithm to obtain the information of the second set of contour points matched with the forehead region.

In such a manner, the information of the first set of contour points and the information of the second set of contour points can be determined, thereby determining the contour key point information of the edge of the facial region. Then, the information of the first key point and the information of the second key point may be obtained based on the contour key point information of the edge of the facial region and the key point information of each organ in the facial region.

Figure 2C:
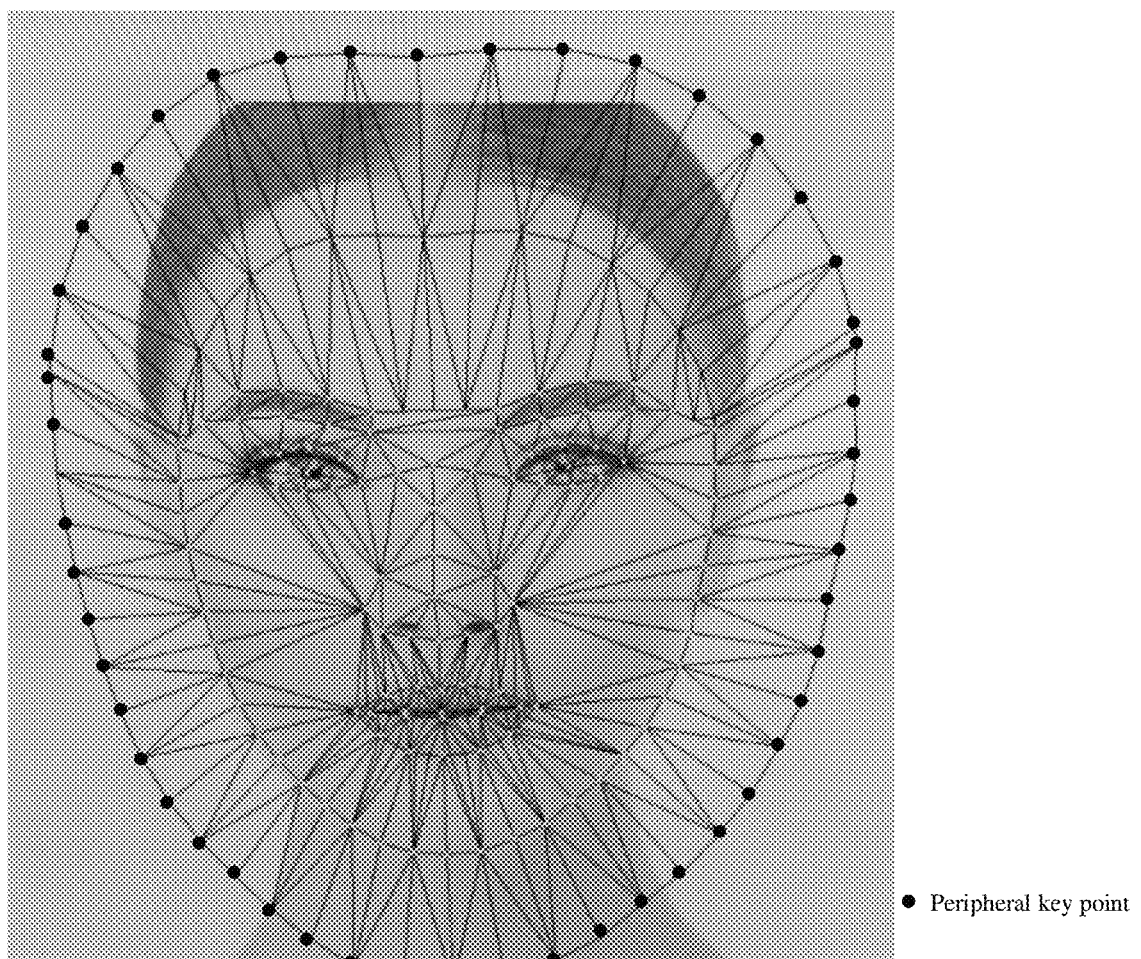
FIG. 2C is a schematic diagram of peripheral key point information in facial key points according to an embodiment of the disclosure.

In some embodiments of the disclosure, the information of the first key point and the information of the second key point may further include peripheral key point information associated with the facial region. The peripheral key point information corresponds to the contour key point information of the edge of the facial region. FIG. 2C is an exemplary description of a peripheral key point.

In some embodiments, the operation that the peripheral key point information is determined may include: a central point of the facial region is determined, the central point being, for example, a key point corresponding to the tip of nose; a distance between each contour key point of the edge of the facial region and the central point is determined, and a direction of each contour key point relative to the central point is determined; and for a first contour key point, a peripheral key point corresponding to the first contour key point is determined in a preset distance away from the first contour key point and towards an outer side of the facial region in a direction along with the first contour key point, the first contour key point being any contour key point of the edge of the facial region. The preset distance is related to a distance between the contour key point of the edge and the central point. If the distance between the contour key point of the edge and the central point is longer, the preset distance is longer. If the distance between the contour key point of the edge and the central point is shorter, the preset distance is shorter. Based on such a manner, the peripheral key point information outside the facial region shown in FIG. 2C may be determined.

In the embodiment, a purpose of determining the peripheral key point information is that, in an image morphing processing process, particularly in a process of performing image morphing processing in a triangular morphing region-based morphing processing manner, adaptive morphing processing may be performed on a triangular morphing region formed by the peripheral key point information and the contour key point information of the edge of the facial region, namely adaptive morphing processing may be performed on a transition region (i.e., a region between the peripheral key point and the contour key point of the edge of the facial region) associated with the facial region, thereby achieving a better image morphing effect and making a face fusion effect more natural.

In some embodiments of the disclosure, the operation 103 may include: a first conversion relationship is determined based on the information of the first key point and the information of the second key point; morphing processing is performed on the face of the target object in the first image based on the first conversion relationship to obtain a first reference image; a facial key point of a target object in the first reference image is detected to obtain information of a third key point; and a second conversion relationship is determined based on the information of the second key point and the information of the third key point.

In the embodiment of the disclosure, at least the first conversion relationship based on which conversion processing is performed on the first image and the second conversion relationship based on which conversion processing is performed on the second image are included. Moreover, conversion processing may be performed on the first image based on the first conversion relationship to obtain the first reference image. The facial key point of the target object in the first reference image may be extracted and recorded as the information of the third key point. The second conversion relationship may be determined based on the information of the second key point and the information of the third key point. In this way, the second image can be converted to the first reference image to fuse the faces of the target objects in the first image and the second image to achieve an effect that the face of the target object in the obtained third image is similar to the faces in both the first image and the second image.

It is to be noted that, in the embodiment, the operation that fusion processing is performed on faces of target objects in two images may include that the faces of the target objects in the two images are fused to make a face of the target object in an obtained new image similar to the faces of the target objects in both the first image and the second image, and may further include that morphing processing is performed on the face of the target object in one image of the two images and then the face of the target object subjected to morphing processing and the face of the target object in the image not subjected to morphing processing are fused.

With adoption of the technical solution of the embodiment of the disclosure, different face images can be fused to obtain one face image on one hand; and on the other hand, facial key points can be detected to implement accurate positioning of the facial key points (for example, a facial organ and contour), and corresponding fusion processing or morphing processing may be performed based on the facial key points in a face fusion process, so that the processing effect of face fusion is greatly improved.

Figure 3:
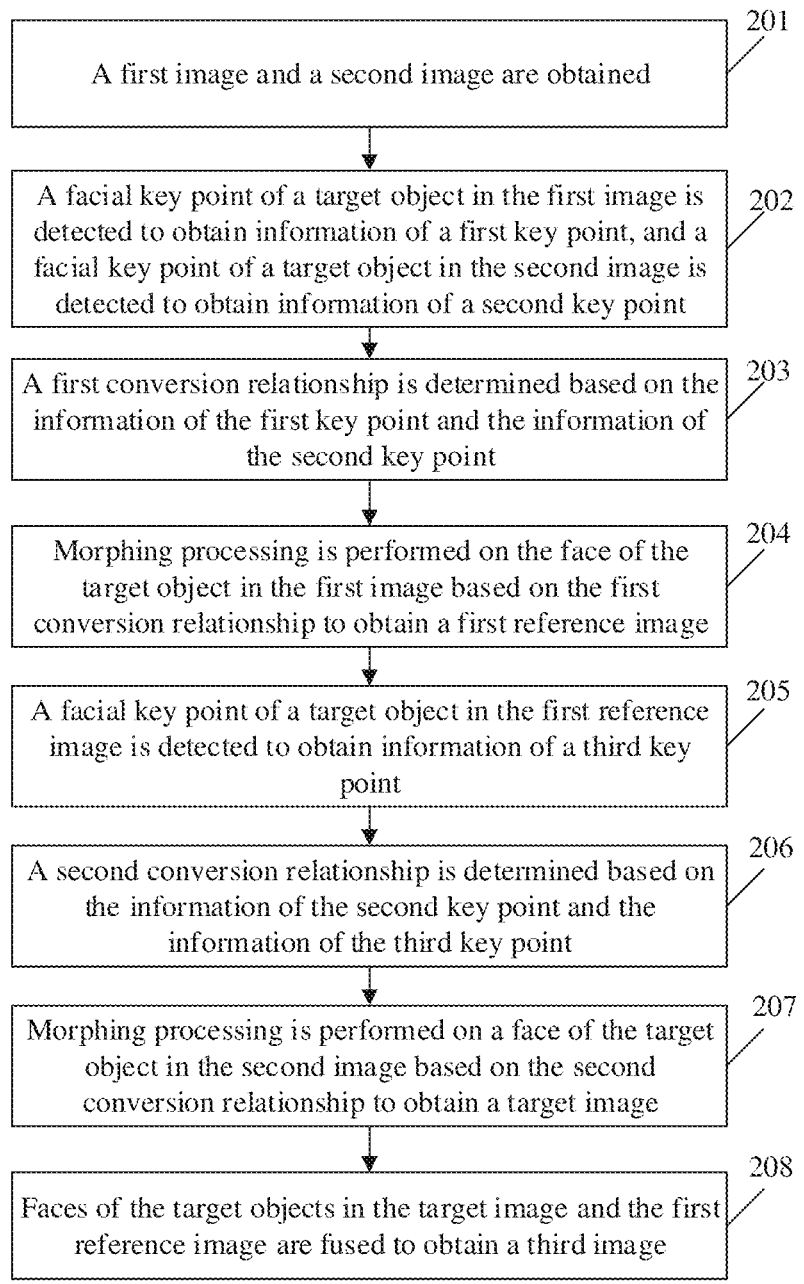
FIG. 3 is a second flowchart of an image processing method according to an embodiment of the disclosure.

Based on the abovementioned embodiment, the embodiments of the disclosure also provide an image processing method. FIG. 3 is a second flowchart of an image processing method according to an embodiment of the disclosure. As shown in FIG. 3, the method includes the following operations.

In operation 201, a first image and a second image are obtained.

In operation 202, a facial key point of a target object in the first image is detected to obtain information of a first key point, and a facial key point of a target object in the second image is detected to obtain information of a second key point.

In operation 203, a first conversion relationship is determined based on the information of the first key point and the information of the second key point.

In operation 204, morphing processing is performed on the face of the target object in the first image based on the first conversion relationship to obtain a first reference image.

In operation 205, a facial key point of a target object in the first reference image is detected to obtain information of a third key point.

In operation 206, a second conversion relationship is determined based on the information of the second key point and the information of the third key point.

In operation 207, morphing processing is performed on a face of the target object in the second image based on the second conversion relationship to obtain a target image.

In operation 208, faces of the target objects in the target image and the first reference image are fused to obtain a third image.

In the embodiment, detailed descriptions about operations 201 to 202 may specifically refer to the detailed descriptions about operations 101 to 102 in the abovementioned embodiment, and elaborations are omitted herein.

In the embodiment, the first conversion relationship may be determined based on a coordinate, represented by the information of the first key point, of each key point and a coordinate, represented by the information of the second key point, of each key point in operation 203. Exemplarily, the first conversion relationship may be implemented through a conversion matrix. An manner for obtaining the conversion matrix may include that: a set of coordinates of initial key points are determined, the set of coordinates of the initial key points being represented by a matrix (for example, recorded as matrix H); a set of coordinates of target key points are determined, the set of coordinates of the target key points being represented by another matrix (for example, recorded as matrix P); and if the conversion matrix is recorded as Q, $H \cdot Q = P$, namely $Q = P \cdot H^{-1}$. It can be understood that it is expected that conversion may be performed on the information of the first key point based on the first conversion relationship (for example, a first conversion matrix) to obtain the information of the second key point, but key point information obtained by performing conversion on the information of the first key point based on the first conversion relationship (for example, the first conversion matrix) may not be completely matched with the information of the second key point for various reasons such as errors. Therefore, in the embodiment, the first image is processed based on the first conversion relationship (for example, the first conversion matrix) in operation 204. Specifically, morphing processing is performed on the face of the target object in the first image based on the first conversion relationship, and an obtained image is recorded as the first reference image. Exemplarily, the first conversion relationship in each embodiment of the disclosure may be implemented through the first conversion matrix determined based on the set of coordinates of first key points and the set of coordinates of second key points.

In the embodiment, an acquisition manner for the information of the third key point in operation 205 may refer to the detailed descriptions about an acquisition manner for the information of the first key point and the information of the second key point in operation 102 in the abovementioned embodiment and will not be elaborated herein. Exemplarily, the number of key points corresponding to the information of the third key point may also be 106.

In some embodiments of the disclosure, for operation 206, both the information of the second key point and the information of the third key point includes coordinate information of corresponding key point. The operation that the second conversion relationship is determined based on the information of the second key point and the information of the third key point may include: weighted stacking processing is performed on the information of the second key point and the information of the third key point to obtain information of a fourth key point, and the second conversion relationship is determined based on the information of the second key point and the information of the fourth key point.

In some embodiments, key point information (for example, the information of the second key point, the information of the third key point and the information of the fourth key point) may include a coordinate of a key point. Weighted stacking processing may be performed on the coordinate of the second key point and the coordinate of the third key point based on a preset weight coefficient to obtain a coordinate of the fourth key point. Then, the second conversion relationship may be determined based on the coordinate of the second key point and the coordinate of the fourth key point.

Exemplarily, the coordinate of the fourth key point may meet the following expression:

$$PT4=\text{alpha}\times PT2+(1-\text{alpha})\times PT3 \quad (1).$$

PT4 represents the coordinate of the fourth key point, PT2 represents the coordinate of the second key point, PT3 represents the coordinate of the third key point, and alpha represents the weight coefficient.

Morphing processing may subsequently be performed on the information of the second key point in the second image towards the information of the fourth key point based on the second conversion relationship to ensure that the key point information in the second image (i.e., the target image) subjected to morphing processing is matched with the information of the fourth key point, namely the coordinate of the key point in the target image is close to the coordinate of the fourth key point.

In some embodiments, morphing processing may be performed on the second image through an Inverse Distance Weighted (IDW) algorithm to obtain the target image. Specifically, according to the IDW algorithm, there is made such a hypothesis that each key point (i.e., the second key point and the fourth key point) has local impact on the target key point in the target image, and such impact may be reduced along with prolonging of a distance. A coordinate of an initial target key point in the target image obtained by performing morphing processing on the second image is hypothesized, and a distance between the initial target key point and the second key point or the fourth key point is determined based on the coordinate of the second key point and the coordinate of the fourth key point. A weight of the second key point for the initial target key point and a weight of the fourth key point for the initial target key point are determined based on the distances. Weighted averaging processing is performed on the distance between the initial target key point and the second key point and the distance between the target key point and the fourth key point based on the determined weights. The target key point is determined based on an obtained result. It can be understood that the second conversion relationship may specifically refer to a process of determining the target key point by use of the IDW algorithm, namely performing morphing processing on the information of the second key point in the second image towards the information of the fourth key point.

In another implementation mode, part of the information of the second key point in the second image may also be selected as a morphing key point(s), and processing may be performed in an IDW manner based on the morphing key point(s). By use of part of key points, the load of data processing may be reduced.

In an embodiment of the disclosure, before the operation that morphing processing is performed on the face of the target object in the second image based on the second conversion relationship, the method further may include: Gaussian blurring processing is performed on a nostril region of the target object in the second image. The operation that morphing processing is performed on the face of the target object in the second image based on the second conversion relationship may include: morphing processing is performed on the face of the target object in the second image subjected to the Gaussian blurring processing based on the second conversion relationship.

In some embodiments of the disclosure, for solving the problem that the nostril region may be obviously black and the nostril region is too incongruous after face fusion, before morphing processing is performed on the second image, Gaussian blurring processing (or also called Gaussian smoothing processing) may be performed on the nostril region of the facial region to face the black nostril region to solve the problem and make the face in the third image obtained by face fusion processing more natural. During a practical application, the nostril region of the target object in the second image may be recognized through a face recognition algorithm (the determined nostril region may be rectangular, round or in any other shape), and Gaussian blurring (or Gaussian smoothing) processing may be performed on the determined nostril region.

In some embodiments of the disclosure, the operation 208 that the faces of the target objects in the target image and the first reference image are fused to obtain the third image may include: a facial key point of a target object in the target image is detected to obtain information of a fifth key point; a third conversion relationship is determined based on the information of the third key point and the information of the fifth key point; morphing processing is performed on the face of the target object in the first reference image based on the third conversion relationship to obtain a second reference image; and the third image is obtained based on the second reference image and the target image.

In the embodiment, an acquisition manner for the information of the fifth key point may refer to the detailed descriptions about the acquisition manner for the information of the first key point and the information of the second key point in operation 102 in the abovementioned embodiment and will not be elaborated herein.

In some embodiments of the disclosure, it can be seen from FIG. 2A that a triangular morphing region may be determined by any three adjacent key points. In the embodiment, according to the same rule, a triangular morphing region may be determined based on the information of the third key point, and a triangular morphing region may be determined based on the information of the fifth key point. The third conversion relationship may be determined based on the coordinate of the third key point and a coordinate of a fifth key point, and morphing processing may be performed on the triangular morphing regions based on the third conversion relationship to obtain the second reference image. It can be understood that a position of the third key point in the first reference image is expected to be morphed to a position of the fifth key point in the target image based on the third conversion relationship, but the position of the third key point that is morphed may usually not completely overlap the position of the fifth key point for reasons such as errors. Therefore, the first reference image subjected to morphing processing is recorded as the second reference image. Furthermore, the third image is obtained based on the second reference image and the target image.

In some examples, the third conversion relationship may be implemented through a conversion matrix corresponding to each triangular morphing region. For example, for a triangular morphing region, coordinates corresponding to three third key points in the first reference image may be determined and form a matrix, recorded as a matrix A; coordinates corresponding to three fifth key points in the target image may be determined and form another matrix, recorded as a matrix B; and if the conversion matrix is recorded as Q, then $A \cdot Q = B$, namely $Q = B \cdot A^{-1}$. In such case, for each triangular morphing region, conversion processing may be performed based on a corresponding third conversion relationship to obtain the second reference image.

In some embodiments of the disclosure, the operation that the third image is obtained based on the second reference image and the target image may include: the second reference image and the target image are fused to obtain a third reference image; and the third reference image and the target image are fused to obtain the third image.

In the embodiment, fusion processing may be performed twice on the obtained second reference image and target image. In another embodiment, fusion processing may also be performed once or more than twice.

In some embodiments of the disclosure, the operation that the second reference image and the target image are fused to obtain the third reference image may include: a first average value of values of pixels in the second reference image is determined, and a second average value of values of pixels in the target image is determined; and a difference value between a value of a first pixel in the second reference image and the first average value is calculated, and the difference value and the second average value are added to obtain the third reference image, the first pixel being any pixel in the second reference image.

In some embodiments, the operation that the first average value of the values corresponding to the pixels in the second reference image is determined may include: the first average value of color component numerical values in the values of the pixels in the second reference image is determined. Correspondingly, the operation that the second average value of the values corresponding to the pixels in the target image is determined may include: the second average value of color component numerical values in the values of the pixels in the target image is determined. In the embodiment, a difference value between the first average value and a color component numerical value of the value of the first pixel in the second reference image is calculated, and the difference value is added to the second average value of color component numerical values in the values of pixels corresponding to the first pixel in the target image to obtain the third reference image.

Specifically, both the second reference image and the target image may be color images, and in such case, the value of each pixel in the second reference image and the target image has color components capable of forming the color image. For example, the color images are Red Green Blue (RGB) images. In such case, each pixel has three numerical values corresponding to a red color component, a green color component and a blue color component respectively, and the numerical values of three color components are combined to form a value of the pixel. Average values of the three color components in the second reference image are obtained respectively, the average value of each color component being recorded as the second average value. Average values of the three color components in the target image are obtained respectively, the average of each color component being recorded as the second average value. For example, for a color component (for example, the red color component, the green color component or the blue color component), the corresponding first average value is subtracted from a numerical value of the color component of each pixel in the second reference image, and then the second average value of the corresponding color component in the target image is added. A similar processing manner can be adopted for other color components and other pixels, and obtained results are numerical values of each color component of each pixel in the third reference image.

In some embodiments of the disclosure, the operation that the third reference image and the target image are fused to obtain the third image may include: weighted summation processing is performed on a value of a second pixel in the third reference image and a value of a pixel corresponding to the second pixel in the target image to obtain the third image, the second pixel being any pixel in the third reference image.

In some embodiments, both the third reference image and the target image may be color images, and in such case, the value of each pixel in the second reference image and the target image has color components capable of forming the color image. For example, the color images are RGB images. In such case, each pixel has three numerical values corresponding to a red color component, a green color component and a blue color component respectively, and the numerical values of the three color components are combined to form a value of the pixel. In the embodiment, weighted stacking may be performed on the numerical values of a certain color component of corresponding pixels in the third reference image and the target image respectively, and a weighted stacking result is a numerical value of the color component of a corresponding pixel in the third image. For example, for a color component (for example, the red color component, the green color component or the blue color component), a numerical value of the color component of a certain pixel in the third reference image is multiplied by a weight coefficient (for example, 40%), a numerical value of the color component of a corresponding pixel in the target image is multiplied by (1−weight coefficient) (for example, 60%), and two results are added to obtain a result as a numerical value of the color component of a corresponding pixel in the third image. During the practical application, an alpha blending algorithm may be adopted for fusion in a second fusion processing manner. In this fusion processing manner, the third reference image and the target image are fused proportionally. In another implementation mode, different weight coefficients may also be set for the third reference image and the target image respectively. A product obtained by multiplying a numerical value of a certain color component of the third reference image by a first proportion coefficient and a product obtained by multiplying a numerical value of the color component in the target image by a second proportion coefficient are superposed to obtain a stacking result and the stacking result is taken as a numerical value of the color component in the third image. A sum of the first proportion coefficient and the second proportion coefficient may be not 1.

In some embodiments of the disclosure, before the operation that the faces of the target objects in the target image and the first reference image are fused to obtain the third image, the method may further include that: optimization processing is performed on the first reference image, the optimization processing including at least one of the following processing on the face of the target object in the first reference image: skin smoothing processing, whitening processing and skin glowing processing. Correspondingly, the operation that the third image is generated based on the target image and the first reference image may include: the third image is generated based on the target image and the optimized first reference image to achieve the effect that the image obtained by face fusion processing is more attractive.

In an embodiment of the disclosure, the method may further include that: image style transfer processing is performed on the third image to obtain a fifth image.

In the embodiment, parameters corresponding to multiple image styles may be pre-configured. The image style may be, for example, an oil painting style, a Chinese painting style and the like, and of course, may also be another image style. When the obtained third image is of a default style and under the condition of determining that there is an image style transfer requirement, for example, receiving an image style transfer instruction, a corresponding image style parameter may be determined according to the image style transfer instruction, and style transfer processing may be performed on the third image based on the image style parameter to obtain the fifth image.

During the practical application, the image style transfer instruction may be received based on human-computer interaction. For example, multiple image style buttons may be displayed on a human-computer interaction interface, and when a user indicates a target image style, a corresponding image style transfer instruction may be received.

With adoption of the technical solution of the embodiment of the disclosure, on a first aspect, different face images can be fused to obtain one face image. On a second aspect, facial key points can be detected to accurately position the facial key points (for example, a facial organ and contour), and corresponding fusion processing or morphing processing can be performed based on the facial key points in the face fusion processing process, so that the processing effect of face fusion is greatly improved. On a third aspect, Gaussian blurring processing may be performed on a nostril region to face the nostril region, so that the problem that the nostril region is obviously black after face fusion processing is solved, the face fusion effect is also greatly improved to a certain extent, and the faces may be fused more naturally. On a fourth aspect, in the embodiment, morphing processing may be performed on the second image through the IDW algorithm to retouch five organs on the face, and morphing processing may be performed on the first reference image based on the triangular morphing region to convert the facial region. On a fifth aspect, in the embodiment, average-value-based fusion processing and a proportional-blending-based processing may be adopted for fusion of the second reference image and the target image. The processing process is simple, and the processing efficiency is improved.

Figure 4:
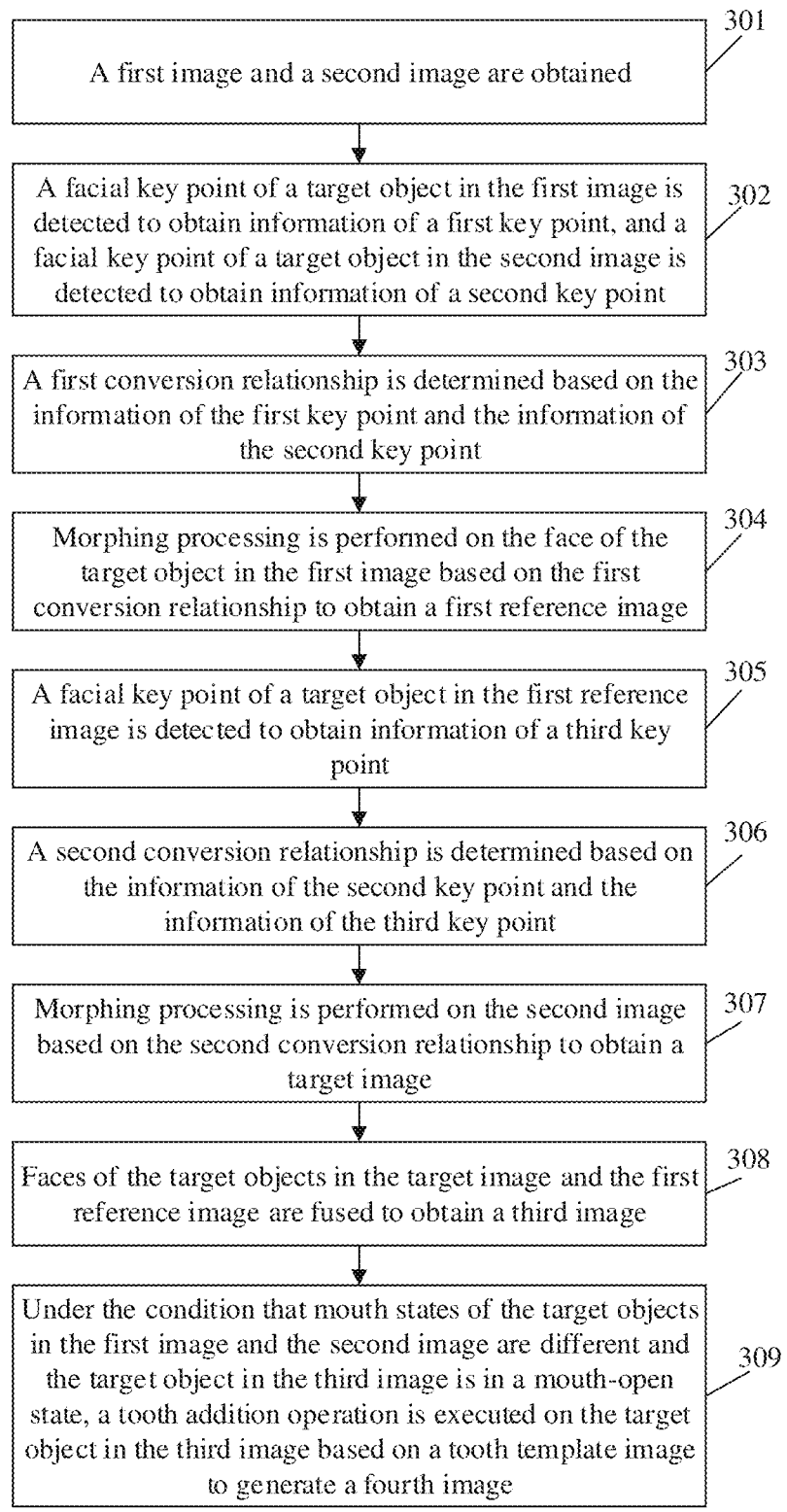
FIG. 4 is a third flowchart of an image processing method according to an embodiment of the disclosure.

The embodiments of the disclosure also provide an image processing method. FIG. 4 is a third flowchart of an image processing method according to an embodiment of the disclosure. As shown in FIG. 4, the method includes the following operations.

In operation 301, a first image and a second image are obtained.

In operation 302, a facial key point of a target object in the first image is detected to obtain information of a first key point, and a facial key point of a target object in the second image is detected to obtain information of a second key point.

In operation 303, a first conversion relationship is determined based on the information of the first key point and the information of the second key point.

In operation 304, morphing processing is performed on the face of the target object in the first image based on the first conversion relationship to obtain a first reference image.

In operation 305, a facial key point of a target object in the first reference image is detected to obtain information of a third key point.

In operation 306, a second conversion relationship is determined based on the information of the second key point and the information of the third key point.

In operation 307, morphing processing is performed on the second image based on the second conversion relationship to obtain a target image.

In operation 308, faces of the target objects in the target image and the first reference image are fused to obtain a third image.

In operation 309, under the condition that mouth states of the target objects in the first image and the second image are different and the target object in the third image is in a mouth-open state, a tooth addition operation is executed on the target object in the third image based on a tooth template image to generate a fourth image.

In the embodiment, detailed descriptions about operations 301 to 308 may specifically refer to the detailed descriptions about operations 201 to 208 in the abovementioned embodiment, and elaborations are omitted herein.

In the embodiment, in operation 309, when the target objects in both the first image and the second image are in a mouth-closed state, the target object in the third image obtained by face fusion processing is also in the mouth-closed state. When the target object in one of the first image and the second image is in the mouth-closed state and the target object in the other image is in the mouth-open state, the target object in the third image obtained by face fusion processing may be in the mouth-closed state or the mouth-open state. When the target object in the third image is in the mouth-open state, it is necessary to perform tooth filling processing to achieve a more natural face fusion effect.

In the embodiment, multiple tooth template images may be pre-configured, and one tooth template image may be selected from the multiple tooth template images and added to a mouth region of the target object, thereby adding teeth to the target object to generate the fourth image. During the practical application, different tooth template images may be associated with a shape of an open mouth region of the target object. Under the condition that the target object in the third image is in the mouth-open state, the shape of the open mouth region of the target object can be recognized through an image recognition algorithm, and a corresponding type identifier may be determined based on the shape. The multiple tooth template images may be indexed by corresponding type identifiers. Indexes of the multiple tooth template images may be queried based on the type identifier to obtain the tooth template image corresponding to the type identifier, and the tooth template image may be added to the open mouth region of the target object, thereby implementing tooth addition.

In some embodiments of the disclosure, the method further may include: image style transfer processing is performed on the fourth image to obtain a fifth image.

In the embodiment, parameters corresponding to multiple image styles may be pre-configured. The image style may be, for example, an oil painting style, a Chinese painting style and the like, and of course, may also be another image style. When the obtained fourth image is of a default style and under the condition of determining that there is an image style transfer requirement, for example, receiving an image style transfer instruction, a corresponding image style parameter may be determined according to the image style transfer instruction, and style transfer processing may be performed on the fourth image based on the image style parameter to obtain the fifth image.

During the practical application, the image style transfer instruction may be received based on human-computer interaction. For example, multiple image style buttons may be displayed on a human-computer interaction interface, and when a user indicates a target image style, a corresponding image style transfer instruction can be received.

The embodiment has the beneficial effects corresponding to the abovementioned embodiments. In addition, under the condition that the third image is in the mouth-open state, tooth filling may be implemented to obtain a more real and natural mouth effect of the image obtained by face fusion processing.

Figure 5:
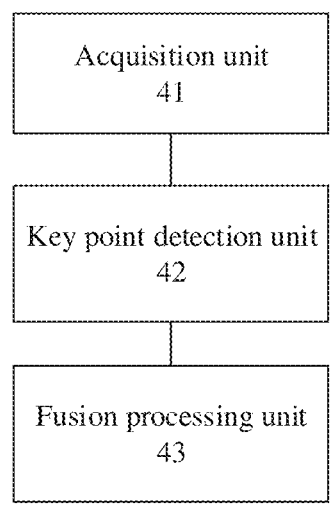
FIG. 5 is a first composition structure diagram of an image processing device according to an embodiment of the disclosure.

The embodiments of the disclosure also provide an image processing device. FIG. 5 is a first composition structure diagram of an image processing device according to an embodiment of the disclosure. As shown in FIG. 5, the device includes an acquisition unit 41, a key point detection unit 42 and a fusion processing unit 43.

The acquisition unit 41 is configured to obtain a first image and a second image.

The key point detection unit 42 is configured to detect a facial key point of a target object in the first image to obtain information of a first key point and detect a facial key point of a target object in the second image to obtain information of a second key point.

The fusion processing unit 43 is configured to determine a conversion relationship based on the information of the first key point and the information of the second key point and fuse faces of the target objects in the first image and the second image based on the conversion relationship to obtain a third image.

In some embodiments of the disclosure, the fusion processing unit 43 is configured to determine a first conversion relationship based on the information of the first key point and the information of the second key point and perform morphing processing on the face of the target object in the first image based on the first conversion relationship to obtain a first reference image.

The key point detection unit 42 is further configured to detect a facial key point of a target object in the first reference image to obtain information of a third key point.

The fusion processing unit 43 is further configured to determine a second conversion relationship based on the information of the second key point and the information of the third key point.

In some embodiments of the disclosure, the fusion processing unit 43 is configured to perform morphing processing on the face of the target object in the second image based on the second conversion relationship to obtain a target image and fuse faces of target objects in the target image and the first reference image to obtain the third image.

In some embodiments of the disclosure, the information of the second key point includes coordinate information of the second key point and the information of the third key point includes coordinate information of the third key point. The fusion processing unit 43 is configured to perform weighted stacking processing on the information of the second key point and the information of the third key point to obtain information of a fourth key point and determine the second conversion relationship based on the information of the second key point and the information of the fourth key point.

In some embodiments of the disclosure, the fusion processing unit 43 is configured to detect a facial key point of a target object in the target image to obtain information of a fifth key point, determine a third conversion relationship based on the information of the third key point and the information of the fifth key point, perform morphing processing on the face of the target object in the first reference image based on the third conversion relationship to obtain a second reference image and obtain the third image based on the second reference image and the target image.

In some embodiments of the disclosure, the fusion processing unit 43 is configured to fuse the second reference image and the target image to obtain a third reference image and fuse the third reference image and the target image to obtain the third image.

In some embodiments of the disclosure, the fusion processing unit 43 is configured to determine a first average value of values of pixels in the second reference image, determine a second average value of values of pixels in the target image, calculate a difference value between a value of a first pixel in the second reference image and the first average value and add the difference value to the second average value to obtain the third reference image, the first pixel being any pixel in the second reference image.

In some embodiments of the disclosure, the fusion processing unit 43 is configured to perform weighted summation processing on a value of a second pixel in the third reference image and a value of a pixel corresponding to the second pixel in the target image to obtain the third image, the second pixel being any pixel in the third reference image.

In some embodiments of the disclosure, the fusion processing unit 43 is configured to, before the faces of the target objects in the target image and the first reference image are fused to obtain the third image, perform optimization processing on the first reference image. The optimization processing may include at least one of the following processing on the face of the target object in the first reference image: skin smoothing processing, whitening processing and skin glowing processing. The fusion processing unit 43 is further configured to generate the third image based on the target image and the optimized first reference image.

In some embodiments of the disclosure, the fusion processing unit 43 is configured to, before performing morphing processing on the face of the target object in the second image based on the second conversion relationship, perform Gaussian blurring processing on a nostril region of the target object in the second image, and is further configured to perform morphing processing on the face of the target object in the second image subjected to the Gaussian blurring processing based on the second conversion relationship.

In some embodiments of the disclosure, the key point detection unit 42 is configured to detect the first image based on a facial key point detection algorithm to obtain key point information of each organ in a facial region of the first image and contour key point information of an edge of the facial region.

In some embodiments of the disclosure, the key point detection unit 42 is configured to obtain information of a first set of contour key points in a region below eyes in the facial region, determine information of a second set of contour key points in a forehead region based on key point information related to the forehead region in the facial region and determine the contour key point information of the edge of the facial region based on the information of the first set of contour key points and the information of the second set of contour key points.

In some embodiments of the disclosure, the information of the first key point and the information of the second key point further include peripheral key point information associated with the facial region; and the peripheral key point information corresponds to the contour key point information of the edge of the facial region.

In some embodiments of the disclosure, the key point detection unit 42 is further configured to determine a central point of the facial region, determine a distance between each contour key point of the edge of the facial region and the central point, determine a direction of each contour key point relative to the central point, and for a first contour key point, determine a peripheral key point corresponding to the first contour key point in a preset distance away from the first contour key point and towards an outer side of the facial region in a direction along with the first contour key point, the first contour key point being any contour key point of the edge of the facial region.

Figure 6:
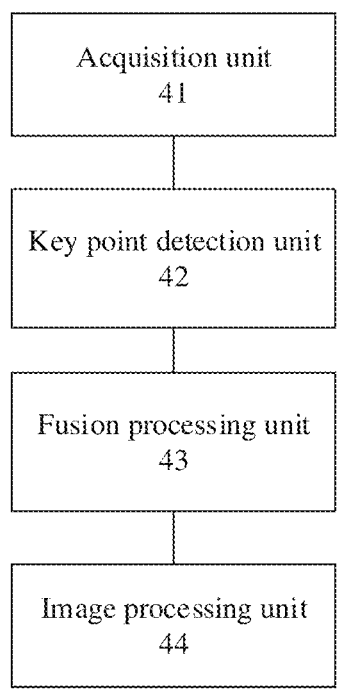
FIG. 6 is a second composition structure diagram of an image processing device according to an embodiment of the disclosure.

In some embodiments of the disclosure, as shown in FIG. 6, the device may further include an image processing unit 44, configured to, under the condition that mouth states of the target objects in the first image and the second image are different and a target object in the third image is in a mouth-open state, execute a tooth addition operation on the target object in the third image based on a tooth template image to generate a fourth image.

Figure 7:
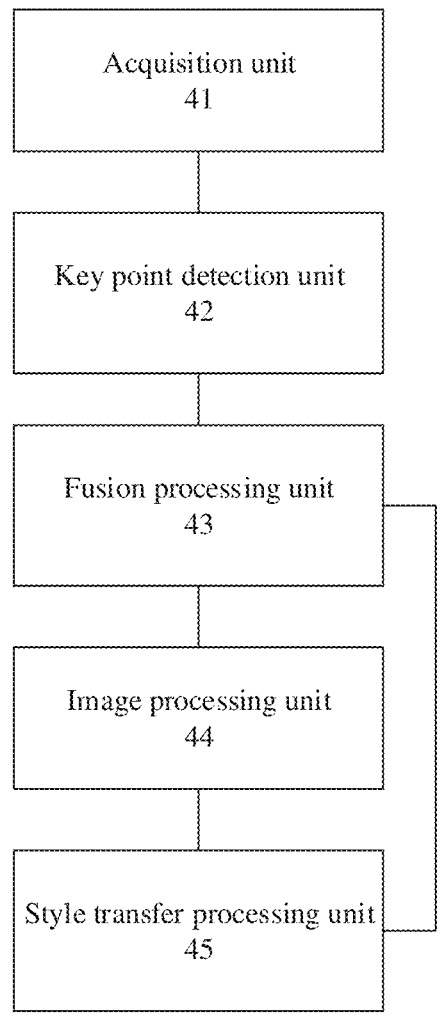
FIG. 7 is a third composition structure diagram of an image processing device according to an embodiment of the disclosure.

In some embodiments of the disclosure, as shown in FIG. 7, the device may further include a style transfer processing unit 45, configured to perform image style transfer processing on the third image or the fourth image obtained by executing the tooth addition operation on the third image to obtain a fifth image.

In the embodiments of the disclosure, all the acquisition unit 41, key point detection unit 42, fusion processing unit 43, image processing unit 44 and style transfer processing unit 45 in the image processing device may be implemented by a Central Processing Unit (CPU), a Digital Signal Processor (DSP), Microcontroller Unit (MCU) or Field-Programmable Gate Array (FPGA) in a terminal during a practical application.

It is to be noted that the image processing device provided in the embodiments is described with division of each of the abovementioned program modules as an example during image processing. During the practical application, such processing may be allocated to different program modules for completion according to a requirement, that is, an internal structure of the device may be divided into different program modules to complete all or part of abovementioned processing. In addition, the image processing device provided in the embodiments belongs to the same concept of the image processing method embodiments. Details about a specific implementation process thereof refer to the method embodiments and will not be elaborated herein.

Figure 8:
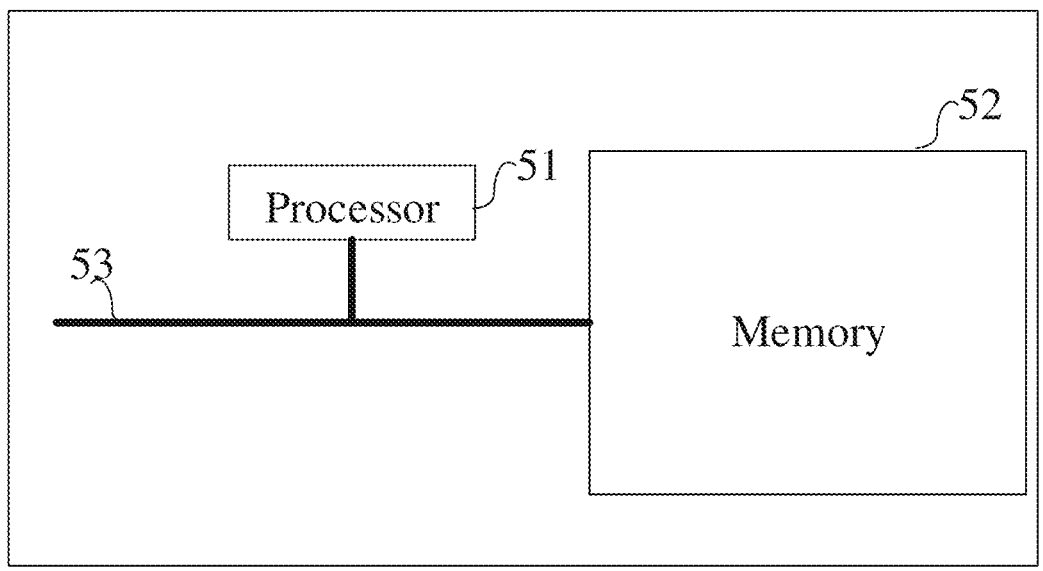
FIG. 8 is a hardware composition structure diagram of an electronic device according to an embodiment of the disclosure.

The embodiments of the disclosure also provide an electronic device. FIG. 8 is a hardware composition structure diagram of an electronic device according to an embodiment of the disclosure. As shown in FIG. 8, the electronic device includes a memory 52, a processor 51 and a computer program stored in the memory 52 and capable of running in the processor 51, the processor 51 executing the program to implement the operations of the method of the embodiments of the disclosure.

It can be understood that each component in the electronic device may be coupled together through a bus system 53. It can be understood that the bus system 53 is configured to implement connection communication between these components. The bus system 53 includes a data bus and further includes a power bus, a control bus and a state signal bus. However, for clear description, various buses in FIG. 8 are marked as the bus system 53.

It can be understood that the memory 52 may be a volatile memory or a nonvolatile memory, and may also include both the volatile and nonvolatile memories. Herein, the nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, a compact disc or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory 52 described in the embodiment of the disclosure is intended to include, but not limited to, memories of these and any other proper types.

The method disclosed in the embodiments of the disclosure may be applied to the processor 51 or implemented by the processor 51. The processor 51 may be an integrated circuit chip with a signal processing capability. In an implementation process, each operation of the method may be implemented by an integrated logic circuit of hardware in the processor 51 or an instruction in a software form. The processor 51 may be a universal processor, a DSP or another Programmable Logic Device (PLD), a discrete gate or transistor logic device, a discrete hardware component and the like. The processor 51 may implement or execute each method, operation and logical block diagram disclosed in the embodiments of the disclosure. The universal processor may be a microprocessor, any conventional processor or the like. The operations of the method disclosed in combination with the embodiments of the disclosure may be directly embodied to be executed and implemented by a hardware decoding processor or executed and implemented by a combination of hardware and software modules in the decoding processor. The software module may be in a storage medium, and the storage medium may be in the memory 52. The processor 51 may read information in the memory 52 and perform the operations of the method in combination with hardware.

In an exemplary embodiment, the electronic device may be implemented by one or more Application Specific Integrated Circuits (ASICs), DSPs, PLDs, Complex Programmable Logic Devices (CPLDs), FPGAs, universal processors, controllers, MCUs, microprocessors or other electronic components, and is configured to execute the abovementioned method.

The embodiments of the disclosure also provide a computer-readable storage medium, in which a computer program is stored, the program being executed by a processor to implement the operations of the method of the embodiments of the disclosure.

The embodiments of the disclosure also provide a processor, which is configured to call a computer program, the processor executing the program to implement the operations of the method of the embodiments of the disclosure.

According to the image processing method and device and an electronic device provided in the embodiments of the disclosure, the method may include: the first image and the second image are obtained; the facial key point of the target object in the first image is detected to obtain the information of the first key point; the facial key point of the target object in the second image is detected to obtain the information of the second key point; the conversion relationship is determined based on the information of the first key point and the information of the second key point; and the faces of the target objects in the first image and the second image are fused based on the conversion relationship to obtain the third image. With adoption of the technical solutions of the embodiments of the disclosure, different face images can be fused to obtain one face image on one hand; and on the other hand, facial key points are detected to implement accurate positioning of the facial key points (for example, a facial organ and contour), and corresponding fusion processing or morphing processing may be performed based on the facial key points in a face fusion process, so that the processing effect of face fusion is greatly improved.

In some embodiments provided by the disclosure, it is to be understood that the device and method may be implemented in another manner. The device embodiments described above are only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, or may be electrical or mechanical or in other forms.

The units described as separate parts may be or may not be physically separated, and parts displayed as units may be or may not be physical units, and namely may be in the same place or may be distributed to multiple network units. Part or all of the units may be selected according to a practical requirement to achieve the purposes of the solutions of the embodiments.

In addition, each functional unit in each embodiment of the disclosure may be integrated into a processing unit. Each unit may also serve as an independent unit and two or more than two units may also be integrated into a unit. The integrated unit may be implemented in a hardware form and may also be implemented in form of hardware and software functional unit.

Those of ordinary skill in the art should know that all or part of the operations of the method embodiment may be implemented by related hardware instructed through a program, the program may be stored in a computer-readable storage medium, and the program is executed to perform the operations of the method embodiment. The storage medium includes: various media capable of storing program codes such as a mobile storage device, a ROM, a RAM, a magnetic disk or a compact disc.

Or, when being implemented in form of software functional module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a mobile hard disk, a ROM, a RAM, a magnetic disk or a compact disc.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for image processing, comprising:
    obtaining a first image and a second image;
    detecting a facial key point of a target object in the first image to obtain information of a first key point, and detecting a facial key point of a target object in the second image to obtain information of a second key point;
    determining a conversion relationship based on the information of the first key point and the information of the second key point; and
    fusing faces of the target objects in the first image and the second image based on the conversion relationship to obtain a third image,
    wherein determining the conversion relationship based on the information of the first key point and the information of the second key point comprises:
        determining a first conversion relationship based on the information of the first key point and the information of the second key point;
        performing morphing processing on the face of the target object in the first image based on the first conversion relationship to obtain a first reference image;
        detecting a facial key point of a target object in the first reference image to obtain information of a third key point; and
        determining a second conversion relationship based on the information of the second key point and the information of the third key point.

2. The method of claim 1, wherein fusing the faces of the target objects in the first image and the second image based on the conversion relationship to obtain the third image comprises:
  performing morphing processing on the face of the target object in the second image based on the second conversion relationship to obtain a target image; and
  fusing faces of the target objects in the target image and the first reference image to obtain the third image.

3. The method of claim 1, wherein the information of the second key point comprises a coordinate of the second key point and the information of the third key point comprises a coordinate of the third key point; and determining the second conversion relationship based on the information of the second key point and the information of the third key point comprises:
  performing weighted stacking processing on the coordinate of the second key point and the coordinate of the third key point to obtain information of a fourth key point, the information of the fourth key point comprising a coordinate of the fourth key point; and
  determining the second conversion relationship based on the coordinate of the second key point and the coordinate of the fourth key point.

4. The method of claim 2, wherein fusing the faces of the target objects in the target image and the first reference image to obtain the third image comprises:
  detecting a facial key point of the target object in the target image to obtain information of a fifth key point;
  determining a third conversion relationship based on the information of the third key point and the information of the fifth key point;
  performing morphing processing on the face of the target object in the first reference image based on the third conversion relationship to obtain a second reference image; and
  obtaining the third image based on the second reference image and the target image.

5. The method of claim 4, wherein obtaining the third image based on the second reference image and the target image comprises:
  fusing the second reference image and the target image to obtain a third reference image; and
  fusing the third reference image and the target image to obtain the third image.

6. The method of claim 5, wherein fusing the second reference image and the target image to obtain the third reference image comprises:
  determining a first average value of values of pixels in the second reference image, and determining a second average value of values of pixels in the target image; and
  calculating a difference value between a value of a first pixel in the second reference image and the first average value, and adding the difference value and the second average value to obtain the third reference image, the first pixel being any pixel in the second reference image.

7. The method of claim 5, wherein fusing the third reference image and the target image to obtain the third image comprises:
  performing weighted summation processing on a value of a second pixel in the third reference image and a value of a pixel corresponding to the second pixel in the target image to obtain the third image, the second pixel being any pixel in the third reference image.

8. The method of claim 2, before fusing the faces of the target objects in the target image and the first reference image to obtain the third image, the method further comprising:
  performing optimization processing on the first reference image, wherein the optimization processing comprises at least one of following processing on the face of the target object in the first reference image: skin smoothing processing, whitening processing and skin glowing processing,
  wherein generating the third image based on the target image and the first reference image comprises:
  generating the third image based on the target image and the optimized first reference image.

9. The method of claim 2, before performing morphing processing on the face of the target object in the second image based on the second conversion relationship, the method further comprising:
  performing Gaussian blurring processing on a nostril region of the target object in the second image,
  wherein performing morphing processing on the face of the target object in the second image based on the second conversion relationship comprises:
  performing, based on the second conversion relationship, morphing processing on the face of the target object in the second image subjected to the Gaussian blurring processing.

10. The method of claim 1, wherein detecting the facial key point of the target object in the first image to obtain the information of the first key point comprises:
  detecting the first image based on a facial key point detection algorithm to obtain key point information of each organ in a facial region of the first image and contour key point information of an edge of the facial region.

11. The method of claim 10, wherein obtaining the contour key point information of the edge of the facial region comprises:
  obtaining information of a first set of contour key points in a region below eyes in the facial region;
  determining information of a second set of contour key points in a forehead region based on key point information related to the forehead region in the facial region; and
  determining the contour key point information of the edge of the facial region based on the information of the first set of contour key points and the information of the second set of contour key points.

12. The method of claim 10, wherein the information of the first key point and the information of the second key point further comprise peripheral key point information associated with the facial region; and the peripheral key point information corresponds to the contour key point information of the edge of the facial region.

13. The method of claim 12, wherein determining the peripheral key point information comprises:
  determining a central point of the facial region;
  determining a distance between each contour key point of the edge of the facial region and the central point, and determining a direction of each contour key point relative to the central point; and
  for a first contour key point, determining a peripheral key point corresponding to the first contour key point, the peripheral key point being in a preset distance away from the first contour key point and towards an outer side of the facial region in a direction along with the first contour key point, and the first contour key point being any contour key point of the edge of the facial region.

14. The method of claim 1, further comprising:
under a condition that mouth states of the target objects in the first image and the second image are different and the target object in the third image is in a mouth-open state, executing a tooth addition operation on the target object in the third image based on a tooth template image to generate a fourth image.

15. The method of claim 1, further comprising:
obtaining a fifth image by performing image style transfer processing on the third image or a fourth image obtained by executing a tooth addition operation on the third image.

16. A device for image processing, comprising:
a processor; and
a memory, configured to store instructions executable by the processor,
wherein the processor is configured to:
  detect a facial key point of a target object in a first image to obtain information of a first key point and detect a facial key point of a target object in a second image to obtain information of a second key point;
  determine a conversion relationship based on the information of the first key point and the information of the second key point; and
  fuse faces of the target objects in the first image and the second image based on the conversion relationship to obtain a third image,
wherein the processor is further configured to:
  determine a first conversion relationship based on the information of the first key point and the information of the second key point and perform morphing processing on the face of the target object in the first image based on the first conversion relationship to obtain a first reference image;
  detect a facial key point of a target object in the first reference image to obtain information of a third key point; and
  determine a second conversion relationship based on the information of the second key point and the information of the third key point.

17. The device of claim 7, wherein the processor is further configured to perform morphing processing on the face of the target object in the second image based on the second conversion relationship to obtain a target image and fuse faces of the target objects in the target image and the first reference image to obtain the third image.

18. A non-transitory computer-readable storage medium, having stored a computer program thereon that, when executed by a processor, implements operations comprising:
  obtaining a first image and a second image;
  detecting a facial key point of a target object in the first image to obtain information of a first key point, and detecting a facial key point of a target object in the second image to obtain information of a second key point;
  determining a conversion relationship based on the information of the first key point and the information of the second key point; and
  fusing faces of the target objects in the first image and the second image based on the conversion relationship to obtain a third image,
wherein determining the conversion relationship based on the information of the first key point and the information of the second key point comprises:
  determining a first conversion relationship based on the information of the first key point and the information of the second key point;
  performing morphing processing on the face of the target object in the first image based on the first conversion relationship to obtain a first reference image
  detecting a facial key point of a target object in the first reference image to obtain information of a third key point; and
  determining a second conversion relationship based on the information of the second key point and the information of the third key point.

* * * * *